3,339,787
HIGH PRESSURE SEAL
Raymond E. Pechacek, Houston, Tex., assignor to Hahn & Clay, a corporation of Texas
Filed July 6, 1965, Ser. No. 469,698
5 Claims. (Cl. 220—46)

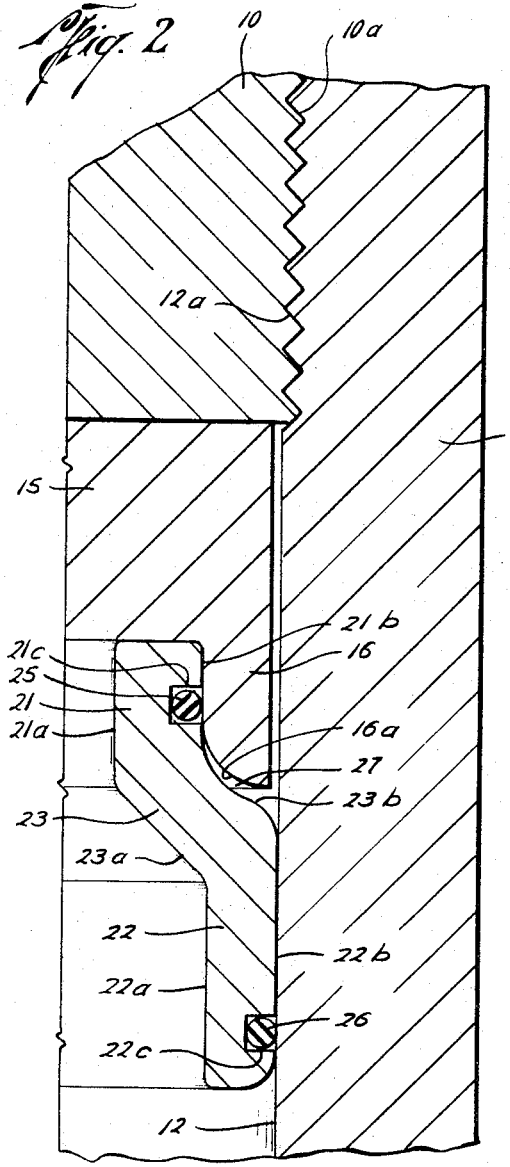
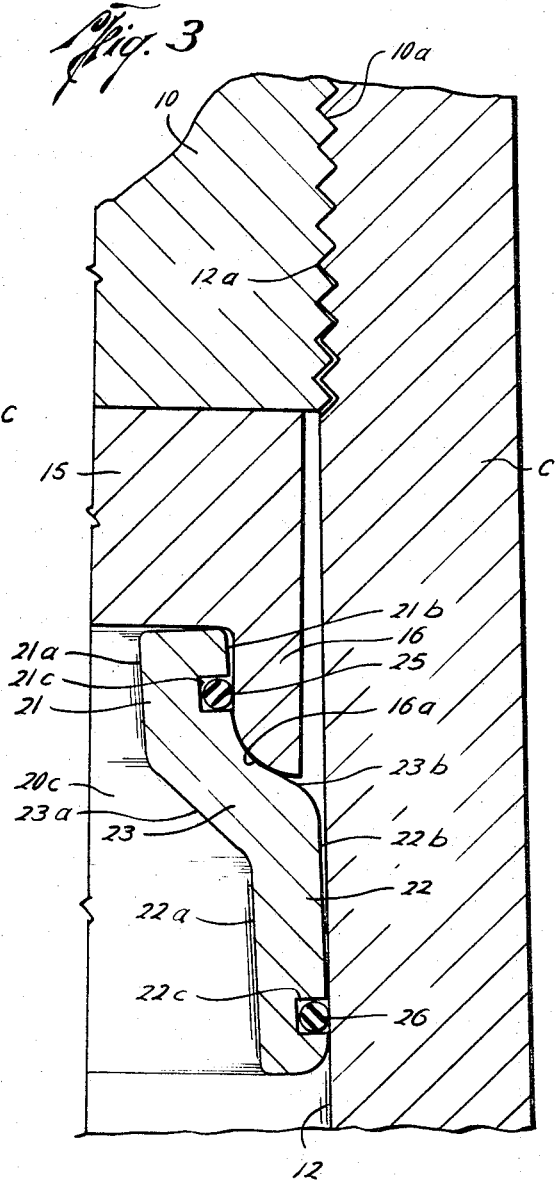
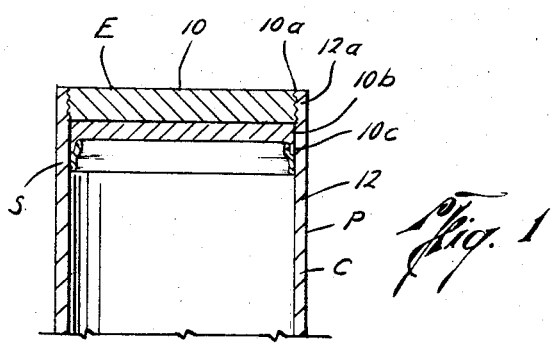
Raymond E. Pechacek
INVENTOR.
BY Hayden & Pravel
ATTORNEYS

# United States Patent Office 3,339,787
Patented Sept. 5, 1967

This invention relates to the art of high pressure seals, and more particularly, to new and useful improvements in high pressure sealing devices having O-ring seals therewith.

In the past, efforts have been made to provide satisfactory seals at high pressures, such as pressures above two thousand pounds per square inch, examples of which are shown in United States Patents Nos. 2,483,156, 3,040,927, and 3,156,475. Such prior efforts have introduced further problems which the present invention overcomes to provide a satisfactory sealing device having O-ring seals therewith.

An object of this invention is to provide a new and improved sealing device which provides a satisfactory seal at relatively high pressures.

An important object of this invention is to provide a new and improved high pressure seal in a vessel, wherein the seal has a metal seal ring which is not welded to the vessel but instead is movable relative thereto with a rocking action to avoid sliding contact between the metal seal ring and the metal vessel wall, whereby galling of the seal ring is inhibited.

It is another object of this invention to provide a new and improved O-ring seal which is mounted in a vessel for rocking action to prevent the metal portion of the seal from becoming permanently expanded beyond its yield point, to thereby prevent the seal from becoming locked in its expanded position.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a vertical sectional view illustrating in simplified form one type of pressure vessel with which the seal of this invention may be used, with only one end of said pressure vessel being shown with a closure;

FIG. 2 is a fragmentary, enlarged sectional view taken from FIG. 1 and illustrating in more detail the preferred embodiment of this invention; and FIG. 3 is a view similar to FIG. 2 but showing the vessel and seal when subjected to high pressure.

In the drawings, the letter P designates generally a pressure vessel which may be of the multilayer type or the solid wall type. The pressure vessel P, as illustrated, is of the solid wall type having a single layer for cylinder C, but such cylinder may be of the multilayer type construction as shown in the Stresau reissue patent, Re. 22,251.

Briefly, the present invention provides a new and improved seal S at an end closure E which forms a satisfactory seal without welds and without being subject to metal-to-metal galling. Also, the seal S of the present invention is so constructed that pressure thereon in the vessel P produces a rocking action which prevents the entire metallic portion of the seal S from becoming expanded beyond its elastic limit, whereby a locking of the seal in the expanded position is avoided. It will be understood that the complete pressure vessel P includes some type of closure such as the closure E for the other end (not shown) of the vessel.

Considering the invention more in detail, the closure E has a closure body 10 with external threads 10a which are adapted to interfit in threaded engagement with threads 12a within the bore 12 of cylinder C. The seal S is disposed in the pressure vessel P, inwardly of the closure body 10 and it includes a metallic seal end plate 15 and a metallic seal ring 20 which coact with each other, as will be explained. The end plate 15 may be integral with or connected to, the end closure body 10 in some instances, but as illustrated, the end plate 15 is separate from the closure body 10 and has a small enough diameter to fit within the bore 12 of the vessel P. The plate 15 has an annular lip 16 which extends longitudinally therefrom and which has an inner, outwardly-curved rocking surface 16a, the purpose of which will be more evident hereinafter.

The annular ring 20 is formed of a first section 21 having an inner annular surface 21a and an outer annular surface 21b, and a second section 22 having an inner annular surface 22a and an outer annular surface 22b. The first and second sections 21 and 22 are joined by an intermediate section 23 having an inner surface 23a and an outer surface 23b. It is to be noted that surfaces 21b and 22b are substantially parallel to the inner cylindrical surface or bore 12 whereas the surface 23b is curved on a radius which is substantially the same or slightly greater than the radius of the curved surface 16a.

The ring 20 is formed of expansible material such as steel so that the second section 22 is adapted to expand radially outwardly, as will be more evident hereinafter. The ring 20 includes O-ring seal grooves 21c and 22c which have therein O-ring seals 25 and 26, respectively. Each O-ring seal 25 and 26 is formed of any one of a number of materials such as silicon rubber, neoprene, butyl rubber, Teflon, nylon, and hollow metal. It will be appreciated that various other materials such as natural rubber may also be used on some circumstances, but since the seal of this invention is primarily intended for use in conjunction with high pressures, that is, pressures exceeding about two thousand pounds per square inch, the material must be capable of sealing at such pressures.

The invention is formed, as shown in FIGS. 2 and 3, so that surface 21b of section 21 and surface 22b of surface 22 remain substantially in contact with annular lip 16 and the inside wall of the pressure vessel P, respectively, to thereby prevent extrusion of the seal rings 25 and 26 as the wall of pressure vessel P expands. To prevent extrusion of the seal rings 25 and 26 upon the application of pressure in vessel P which causes the wall of vessel P to expand, surface 23b of section 23 of O-ring seal 20 pivots as shown in FIG. 3 so that section 22 rocks or expands radially outwardly and surface 22b thereby remains in substantial contact with the inside wall of pressure vessel P. As seen in FIG. 2, surface 21b of section 21 adjacent seal ring 25 is substantially in contact with surface 16a of annular lip 16. Before the application of pressure in the vessel P, there is a gap or space 27 between surfaces 23b and 16a and adjacent the point of contact of surface 21b and 16a as mentioned above. As seen in FIG. 3, pressure is applied in vessel P thereby causing the pressure vessel wall to expand radially outwardly. Section 23 of ring seal 20 rocks or rolls radially outwardly diminishing the gap 27 so that gradually an increasing amount of the surface 23b engages the surface 16a.

In the use of the embodiment of this invention illustrated in FIGS. 1–3 and with the pressure vessel P closed at both ends, the pressure is applied within the vessel P by the introduction of a gas, liquid, or other fluid through any suitable opening in the vessel (not shown). It is contemplated that the present invention may be used with pressures as high as fifty thousand pounds per square inch or even more.

The bore 12 and seal ring 20 are exposed to high pressure within the pressure vessel P and such pressure acts to urge the section 22 of seal ring 20 radially or laterally outwardly to maintain the surface 22b in or near contact with the cylinder wall. Therefore, as discussed above, section 23, upon radial expansion of section 22, rocks or rolls radially outwardly diminishing the gap 27 and section 21 is prevented from radial expansion by annular lip 16.

Because the section 21 of the ring seal 20 is prevented from radially expanding by the blocking action of annular lip 16, the seal ring 20 remains substantially lock free. Locking of sealing rings which have been exposed to high pressure has been a serious problem in prior art seal ring construction. Such locking occurs in the prior art constructions, such as shown in U.S. Patent No. 3,156,475, if the seal ring thereof exceeds its yield point of elasticity so that the seal ring cannot return to its original shape. Thus, when the pressure in the vessel is relieved or reduced so that the wall of the vessel contracts or returns to its original shape or diameter, the seal ring has a larger diameter than it originally had prior to the expansion which places the seal ring under compression and squeezes it to lock it tightly in place within the wall of the vessel. Under such conditions, the seal ring cannot normally be removed without destruction or damage to the seal ring.

With the present invention, on the other hand, the complete seal ring 20 is prevented from radially expanding, as described above. Thus, even if the section 22 should exceed its elastic limit or yield point when radially expanded by the fluid pressure in the vessel P, the section 21 nevertheless is restrained from expanding by reason of its engagement with the lip 16, as above explained. When the pressure in the vessel P is relieved or reduced, the inherent resiliency of the section 21 acts through the intermediate section 23 to exert an inward radial retracting force on the section 23 which returns the section 23 to approximately its original shape, to thus avoid the locking experienced in the prior art.

It is also to be noted that the seal ring 20 of the present invention prevents friction and consequent galling of the metals by using the above-described novel rocking motion.

It is to be noted that the ring 20 has a lesser thickness than the wall of the cylinder C and therefore, section 22 of ring 20 is urged outwardly at a greater expansion rate than the wall of cylinder C. Therefore, when the cylinder C expands due to the high pressure of the gas or other fluid within the pressure vessel P, the contact between the surface 22b and the bore 12 is maintained inwardly of the groove 22c to precent extrusion of the O-ring 26 because section 22 is thin as compared to the thickness of the wall of the pressure vessel P and, therefore, the section 22 expands at the same rate, and preferably at a greater rate than the wall of cylinder C.

As discussed above, the section 21 is not subject to radial expansion and the O-ring 25 remains in substantial contact with the bottom surface of plate 15 and surface 16a as shown in FIG. 3, thereby preventing extrusion of the O-ring 25.

Accordingly, and within the spirit of my invention, the foregoing disclosure and description of the invention is illustrative and explanatory thereof and various changes in the size, shape, and materials, as well as the details of the illustrated construction, may be made within the scope of the appended claims without departing from the spirit of the invention.

What is claimed is:

1. A high pressure seal adapted to seal in contact with a radially expansible wall of a pressure vessel, comprising:
    (a) a closure body adapted to be positioned in said pressure vessel,
    (b) a plate extending from said closure body,
    (c) an annular lip on said plate,
    (d) an annular ring in substantial contact with said lip of said plate and said wall,
    (e) said annular ring having external grooves at the points of substantial contact of said ring with said lip of said plate and said wall,
    (f) an elastic seal ring in each of said grooves for sealing engagement between said ring and said lip of said plate and said ring and said wall of the vessel, and
    (g) said annular ring having a bore which is exposed to pressure in said vessel for expanding that part of said ring in contact with the wall of the pressure vessel radially at least as fast as said wall to prevent extrusion of said seal between said annular ring and said wall.

2. A high pressure seal adapted to seal in contact with a radially expansible wall of a pressure vessel having a closure body, comprising:
    (a) a plate extending from the closure body,
    (b) a lip on said plate,
    (c) a first annular ring section in substantial contact with said lip of said plate for inhibiting outward radial expansion of said ring section,
    (d) a second annular ring section connected to said first section and adapted to remain in substantial contact with the wall of the vessel,
    (e) said first annular ring section having an external groove,
    (f) an elastic seal ring in said groove for sealing engagement with said first annular ring section and said lip of said plate,
    (g) said second annular ring section having an external groove,
    (h) an elastic seal ring in said groove of said second section for sealing engagement with said second annular ring section and the wall,
    (i) said ring sections having a bore which is exposed to the pressure within the pressure vessel to apply an expanding force to said ring sections, and
    (j) said lip restraining said first ring section from expansion when said second ring section is expanded by the pressure within the bore of said ring sections.

3. A high pressure seal adapted to seal in contact with a radially expansible wall of a pressure vessel having a closure body, comprising:
    (a) a plate extending from said closure body,
    (b) a lip on said plate having an inner, outwardly-curved surface extending longitudinally of said vessel,
    (c) a first annular ring section in substantial contact with said lip of said plate for inhibiting outward radial expansion of said ring section,
    (d) a second annular ring section adapted to remain in substantial contact with the wall of the vessel,
    (e) an intermediate annular ring section having an external surface with a curvature substantially like said lip of said plate connecting said first and said second sections,
    (f) said first annular ring section having an external groove,
    (g) an elastic seal ring in said groove for sealing engagement with first annular ring section and said plate and said lip of said plate,
    (h) said second annular ring section having an external groove,
    (i) an elastic seal ring in said groove of said second section for sealing engagement with said second annular ring section and wall, and
    (j) means for exposing said vessel to pressure causing the pressure vessel wall to radially expand whereby said intermediate annular ring section rocks outwardly to gradually increasingly engage said curved surface of said lip so that said second section remains substantially in contact with the expanding pressure vessel wall and whereby said lip restrains said first ring section from expanding.

4. A high pressure seal adapted to seal in contact with a radially expansible wall of a pressure vessel, comprising:
- (a) a closure body adapted to be positioned in a pressure vessel,
- (b) a plate having a rocking surface extending from said body,
- (c) a first annular ring section adapted to remain in substantial contact with said plate,
- (d) a second annular ring section adapted to remain in substantial contact with the wall of the vessel,
- (e) an intermediate annular ring section having an external curved surface substantially like said rocking surface of said plate connecting said first and said second sections,
- (f) said first annular ring section having an external groove,
- (g) an elastic seal ring in said groove for sealing engagement with said first annular ring section and said plate and said lip of said plate,
- (h) said second annular ring section having an external groove,
- (i) an elastic seal ring in said groove of said second section for sealing engagement with said second annular ring section and wall, and
- (j) means for exposing said vessel to pressure whereby said intermediate annular ring section expands radially outwardly to gradually increase engagement with said curved surface of said lip and whereby said second annular ring section remains substantially in contact with said pressure vessel wall.

5. In a pressure vessel having a radially expansible wall with a closure body disposed in at least one end thereof, and a high pressure seal to seal off fluid pressure in the vessel from escape past the closure body, the improvement residing in the high pressure seal, comprising:
- (a) a plate extending from said closure body,
- (b) an annular lip on said plate,
- (c) an annular ring in substantial contact with said lip of said plate and said wall,
- (d) said annular ring having external grooves at the points of substantial contact of said ring with said lip of said plate and said wall,
- (e) an elastic seal ring in each of said grooves for sealing engagement between said ring and said lip of said plate and said ring and said wall of the vessel, and
- (f) said annular ring having a bore which is exposed to pressure in said vessel for expanding that part of said ring in contact with the wall of the pressure vessel radially at least as fast as said wall to prevent extrusion of said seal between said annular ring and said wall.

No references cited.

THERON E. CONDON, *Primary Examiner.*

J. B. MARBERT, *Assistant Examiner.*